United States Patent
Haes (10) Patent No.: US 10,418,201 B2
(45) Date of Patent: Sep. 17, 2019

(54) POINT ON WAVE SWITCHING USING SLOW SPEED PROCESSING

(71) Applicant: Schweitzer Engineering Laboratories, Inc., Pullman, WA (US)

(72) Inventor: Dennis Haes, Colfax, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 67 days.

(21) Appl. No.: 15/896,209

(22) Filed: Feb. 14, 2018

(65) Prior Publication Data

US 2019/0252134 A1  Aug. 15, 2019

(51) Int. Cl.
*H01H 9/56*     (2006.01)
*G05B 19/042*  (2006.01)

(52) U.S. Cl.
CPC ......... *H01H 9/563* (2013.01); *G05B 19/0428* (2013.01); *G05B 2219/21155* (2013.01); *G05B 2219/24015* (2013.01)

(58) Field of Classification Search
CPC ...... G05B 19/0428; G05B 2219/21155; G05B 2219/24015; H01H 9/56; H01H 9/563; H01H 2009/566; H01H 33/593
USPC ........................................................ 700/298
See application file for complete search history.

(56) References Cited

U.S. PATENT DOCUMENTS

| | | | | |
|---|---|---|---|---|
| 10,074,494 B2* | 9/2018 | Parapurath | ............... | H01H 9/56 |
| 2002/0032535 A1* | 3/2002 | Alexander | ........... | G01R 21/133 |
| | | | | 702/64 |
| 2003/0178982 A1* | 9/2003 | Elms | ...................... | G01R 23/00 |
| | | | | 324/76.38 |
| 2007/0252599 A1 | 11/2007 | Zhou et al. | | |
| 2009/0228224 A1* | 9/2009 | Spanier | .................. | G01R 22/10 |
| | | | | 702/60 |
| 2014/0002944 A1 | 1/2014 | Menezes | | |
| 2014/0100702 A1* | 4/2014 | Schweitzer, III | ...... | G05B 13/02 |
| | | | | 700/286 |
| 2015/0179365 A1 | 6/2015 | Parapurath et al. | | |

(Continued)

FOREIGN PATENT DOCUMENTS

| | | |
|---|---|---|
| WO | 2012152793 | 11/2012 |
| WO | 2012152831 | 11/2012 |

OTHER PUBLICATIONS

ABB, "Controlled Switching with Switchsync™", Controlled Switching Buyer's and Application Guide, Aug. 2013, 4th Edition, ABB AB, Ludvika Sweden.

(Continued)

*Primary Examiner* — Chun Cao
(74) *Attorney, Agent, or Firm* — Stoel Rives, LLP (57) ABSTRACT

An intelligent electronic device (IED) may provide point on wave switching. The IED may receive a control operation request, and determine when to issue a control command to cause a switch to change positions. The actuation of the switch may occur at a target point on an alternating current. An IED may have a processor that is too slow to implement a switch when a desired point on an alternating current first occurs. Accordingly, some embodiments may compensate for the processing speed of an IED by determining a number of processor cycles needed (in advance) to issue a control command so that the resulting action results in the desired point on wave open or close.

20 Claims, 6 Drawing Sheets

(56) References Cited

U.S. PATENT DOCUMENTS

2017/0350924 A1\* 12/2017 Choi .................... G01R 21/003
2017/0358404 A1    12/2017 Talluri

OTHER PUBLICATIONS

PCT/US2019/014464 Patent Cooperation Treaty International Search Report and Written Opinion of the International Searching Authority, dated Apr. 12, 2019.

\* cited by examiner

POINT ON WAVE SWITCHING USING SLOW SPEED PROCESSING

TECHNICAL FIELD

The present disclosure relates to point on wave switching systems and methods.

BRIEF DESCRIPTION OF THE DRAWINGS

Non-limiting and non-exhaustive embodiments of the disclosure are described herein, including various embodiments of the disclosure with reference to the figures listed below.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Described herein are systems, methods, and apparatuses for point on wave switching. In some embodiments, a system may determine a time needed to execute a switch command. The time to execute a switch command may include a number of processor cycles to issue the switch command and a time for the switch to implement a change in position.

When a reactive device is driven by an alternating current (AC) power supply, random switching of equipment may damage the reactive device. The random switching may lead to high frequency over-voltage transient and inrush current and cause sudden voltage spikes, increased noise, or other transient disturbances on an electric power system. The transient disturbances may stress equipment and cause damage.

To avoid creating disturbances and/or noise on electrical power systems, point on wave (POW) switching can be used for opening and closing reactive devices. To prevent damage, processors are used to ensure that switching occurs at specific points on an AC wave. For example, a capacitor can be switched at a zero voltage crossing to eliminate disturbances, noise and damage. An inductive reactor can be switched at a peak voltage to eliminate disturbances, noise and damage. These processors receive the switching command and process the AC signal to perform the POW switch. Currently, high-speed processing is required to achieve accurate POW switching. For example, 100 microseconds equals 2.16 electrical degrees at 60 Hz. Thus, a slower processing speed will result in a larger degree of error.

The present disclosure provides systems and methods that may allow for the use of relatively slow speed controllers and/or processors to accurately operate or manage POW switching. Specifically, the present disclosure provides systems, apparatuses, and methods for determining an implementation period and strategically issuing a switch command at an integer multiple of implementation periods before an objective POW. The implementation period may be the number of processor cycles that may occur between the time at which a switch command is issued and the time at which the switch command is completed. The systems and methods of the present disclosure may account for processor delay, stack priority, mechanical delay, and/or other factors to determine the implementation period. Further, the systems and methods of the present disclosure may be applied to a three-phase power system to obtain accurate phase POW switching.

Additional details and examples are provided with reference to the figures below. Generally speaking, the systems and methods disclosed herein may be adapted to interface with or be included as part of a protection element or protection ecosystem, such as a power system protection relay. Such protection devices may be configured to communicate with, control, operate, energize, de-energize, and/or disengage one or more power system components and provide an indication of where a potential fault has occurred. Protection relays may be installed in electric power transmission and distribution facilities to detect overloads, short circuits, and other fault conditions.

Many embodiments of a protective relay include electronic devices employing FPGAs, microcontrollers, CPUs, ND converters, electronic displays, communication ports, and other electronic devices and systems to digitize power system current and/or voltage measurements, and process data associated with the digitized currents and voltages according to various algorithms and/or digital filters. A protective relay may be configured to make protection decisions based on data associated with a digitized power system's currents and/or voltages, and may communicate decisions made by a protective relay to an appropriate system or personnel, and/or may otherwise cause a suitable response to the digitized power system's currents and/or voltages.

An intelligent electronic device (IED), which may be used for monitoring, protecting, and/or controlling industrial and utility equipment, such as in electric power delivery systems, may include system components to implement a method for POW switching. In some embodiments, an IED may have a processor that is too slow to implement a switch when a desired point first occurs. Accordingly, some embodiments described herein compensate for the processing speed of an IED.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term IED may refer to any microprocessor-based device that monitors, controls, automates, and/ or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term IED may be used interchangeably to describe an individual IED or a system comprising multiple IEDs.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special-purpose processing device, such as an ASIC, PAL, PLA, PLD, CPLD, Field Programmable Gate Array (FPGA), or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables; telephone lines; satellites; microwave relays; modulated AC power lines; physical media transfer; wireless radio links; and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

Figure 1:
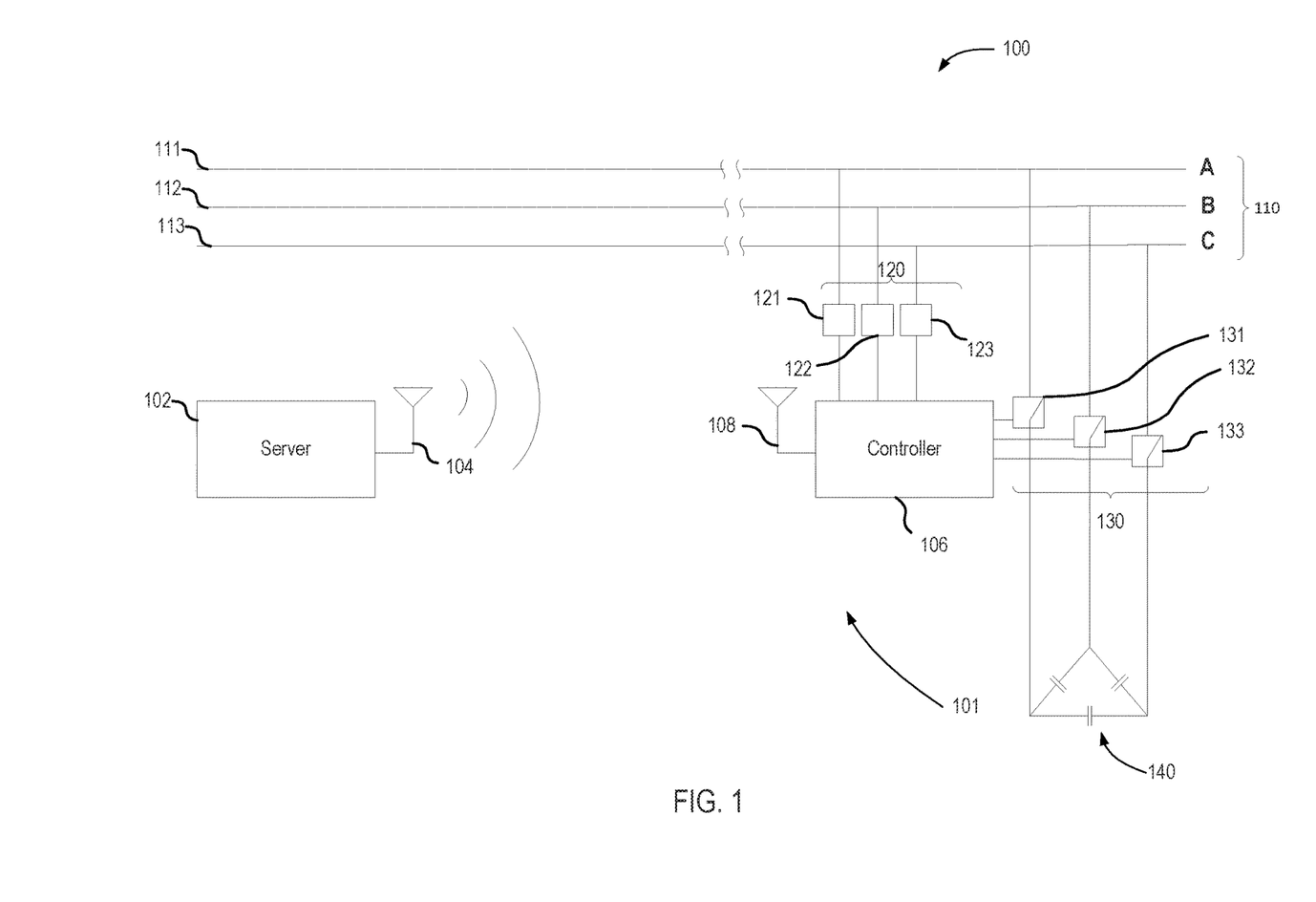
FIG. 1 is a simplified diagram of a three-phase power system that includes a controller for point on wave switching, according to one embodiment of the present disclosure.

FIG. 1 is a block diagram of a POW switching system 101 controlling a three-phase power system 100. As illustrated, the POW switching system 101 may include a server 102 and a controller 106 for POW switching. POW switching allows for reactive devices (such as the capacitor bank 140 of FIG. 1) to receive power and have power removed at approximately the desired phase angle. If reactive devices are switched on and off at the desired POW, electrical noise and/or other disturbances on the power system may be circumvented. The controller 106 may achieve accurate POW switching without requiring an interrupt routine and/or a high processing speed. Specifically, the controller 106 may determine an implementation period and begin to issue a switching command on the three-phase power system 100 an integer multiple of implementation periods away from a target POW.

The three-phase power system 100 of FIG. 1 comprises three phase lines 110 (phase line A 111, phase line B 112, and phase line C 113) and a capacitor bank 140. The phase lines 110 may carry power at three different phases to the capacitor bank 140.

The POW switching system 101 comprises a server 102 with a transmitter 104, a controller 106 with a receiver 108, a set of switches 130 (switch A 131, switch B 132, and switch C 133, herein collectively referred to as switches 130), and a set of sensors 120 (sensor A 121, sensor B 122, and sensor C 123, herein collectively referred to as sensors 120).

The switches 130 may comprise IEDs, breakers, relays, and/or other electrical, mechanical, or electromechanical devices to conditionally couple the phase lines 110 to the capacitor bank 140. The switches 130 when closed may allow power on the three phase lines 110 to pass to the capacitor bank 140, and when opened may prevent power on the three phase lines 110 from passing to the capacitor bank 140. Specifically, switch A 131 may conditionally allow power from phase line A 111 to pass to the capacitor bank 140, switch B 132 may conditionally allow power from phase line B 112 to pass to the capacitor bank 140, and switch C 133 may conditionally allow power from phase line C 113 to pass to the capacitor bank 140.

The controller 106 may be an IED comprising a processor for managing power in POW applications. In some embodiments, the controller 106 may perform multiple functions. For example, the controller 106 may be a relay with a processor that both protects the three-phase power system 100 and performs POW switching. The controller 106 may manage or control the switches 130.

Further, the controller 106 may receive information from the sensors 120 about the three phase lines 110. Specifically, the controller 106 may receive information about phase line A 111 from sensor A 121, information about phase line B 112 from sensor B 122, and information about phase line C 113 from sensor C 123. The sensors 120 may be current sensors, voltage sensors, hall effect sensors, power sensors, and/or any other suitable mechanism(s) for gathering information from power lines. The information gathered by the sensors 120 may comprise the phase angles, the frequency, and/or the magnitude of the voltage, current, and/or power from the three phase lines 110. Further, the controller 106 may also receive information and/or commands from the server 102 via the receiver 108.

The server 102 may be an IED comprising a human-machine interface (HMI), processor, and network interface or other suitable device for transmitting signals to the controller 106. The server 102 may allow a user or program to input commands for POW switching. Specifically, the server 102 may allow a user or program to input commands for POW switching on the three-phase power system 100. The server 102 may communicate with the controller 106 via the transmitter 104. For example, the server 102 may transmit an electromagnetic signal to the receiver 108 of the controller 106. In various embodiments, the transmitter 104 of the server 102 may be coupled to the receiver 108 of the controller 106 directly (i.e., with wires or other suitable medium for communication).

The controller 106 may achieve accurate POW switching without requiring an interrupt routine and/or a high processing speed. For example, a command to switch power to the capacitor bank 140 on or off may be issued by a user or program through the server 102. The controller 106 may subsequently determine, via the sensors 120, respective phase angles and frequencies of each of the phase lines 110. The controller 106 may further determine an implementation period for each of the three phases of the phase lines 110. The implementation period(s) may comprise the sum of the number of processing cycles required to issue the control command and the number of processing cycles required to implement the control command. Specifically, the implementation period(s) may take into consideration the processing speed of the controller 106, the processing speed of any processors of the switches 130, the physical/mechanical delay of the switches 130, the electrical delay of the switches 130, the stack priority of the controller 106, and/or any environmental factors that may affect the processing speed of the controller 106 and/or the physical/mechanical delay of the switches 130. For example, it may be determined that a switching process takes a certain number of processing cycles. However, the processor resources may not be available for every cycle due to stack priority, therefore additional processing cycles would need to be added.

The controller 106 may use information from previous capacitor bank 140 switching times to determine an objective POW at which to switch the switches 130. Once an implementation period(s) is determined, the controller 106 may begin to issue the control command when the target POW is an integer multiple of implementation periods away from occurring based on the respective phase angles and frequencies of the three phase lines 110. In some embodiments, the controller 106 may issue the control command to make a switch using the fewest of implementation periods possible. In some embodiments, the controller 106 may delay the issuance of the control command to cluster the operation times of the switches 130.

The controller 106 may further optimize POW switching for the three different phase lines 110 such that switching occurs at roughly the shortest time for each of the three phase lines 110. Specifically, the controller 106 may consider the times (i.e., number of processor cycles) at which the desired POW occurs for the different phase lines 110. For example, the number of processor cycles at which the desired POW occurs may be 73 for phase line A 111, 112 for phase line B 112, and 101 for phase line C 113. In this example, the maximum difference between desired POW occurrences of the phase lines 110 is 39 processing cycles. If more processing cycles are allowed to occur, the desired POW of each of the three phase lines 110 may occur in closer intervals. According to the example, if more processing cycles were allowed to occur, the number of processor cycles at which the desired POW occurs again may be 140 for phase line A 111, 162 for phase line B 112, and 151 for phase line C 113. In this example, the maximum difference between desired POW occurrences of the phase lines 110 is 22. The controller 106 may select the group of processor cycle durations that corresponds to the smallest difference between POW occurrences of the three phase lines 110 within a threshold.

In various applications, it is desirable that POW switching occurs with as little delay as possible. The controller 106 may receive a first threshold of time (i.e., number of processor cycles) within which the smallest difference between POW occurrences of the three phase lines 110 may be determined. Alternatively, the controller 106 may receive a second threshold of time difference, where the maximum time difference between POW occurrences of the three phase lines 110 may be smaller than the second threshold. Further, the controller 106 may receive both the first and the second threshold and adjust the second threshold if it cannot be met within the first threshold. Alternatively, the controller 106 may receive both the first and the second threshold and adjust the first threshold if the second threshold cannot be met within the first threshold. The controller 106 may be modified to adjust either the first or second threshold according to user preferences.

In one embodiment, the relative phases of the three phase lines 110 are known and only one sensor 120 is used. According to the embodiment, the relative phases are implicitly given once a reading is made from the one sensor.

It should be understood that although a capacitor bank 140 is shown in FIG. 1, the principles explained previously may apply to any reactive device or group of reactive devices. Further, it should be understood that although a three-phase power system 100 is illustrated in FIG. 1, the principles explained previously may apply to any number of phases or phase lines including a single phase or phase line. Additionally, it should be understood that although the server 102 and the controller 106 are illustrated as separate modules in FIG. 1, it is possible that the controller 106 and the server 102 are implemented on a single piece of hardware.

Figure 2:
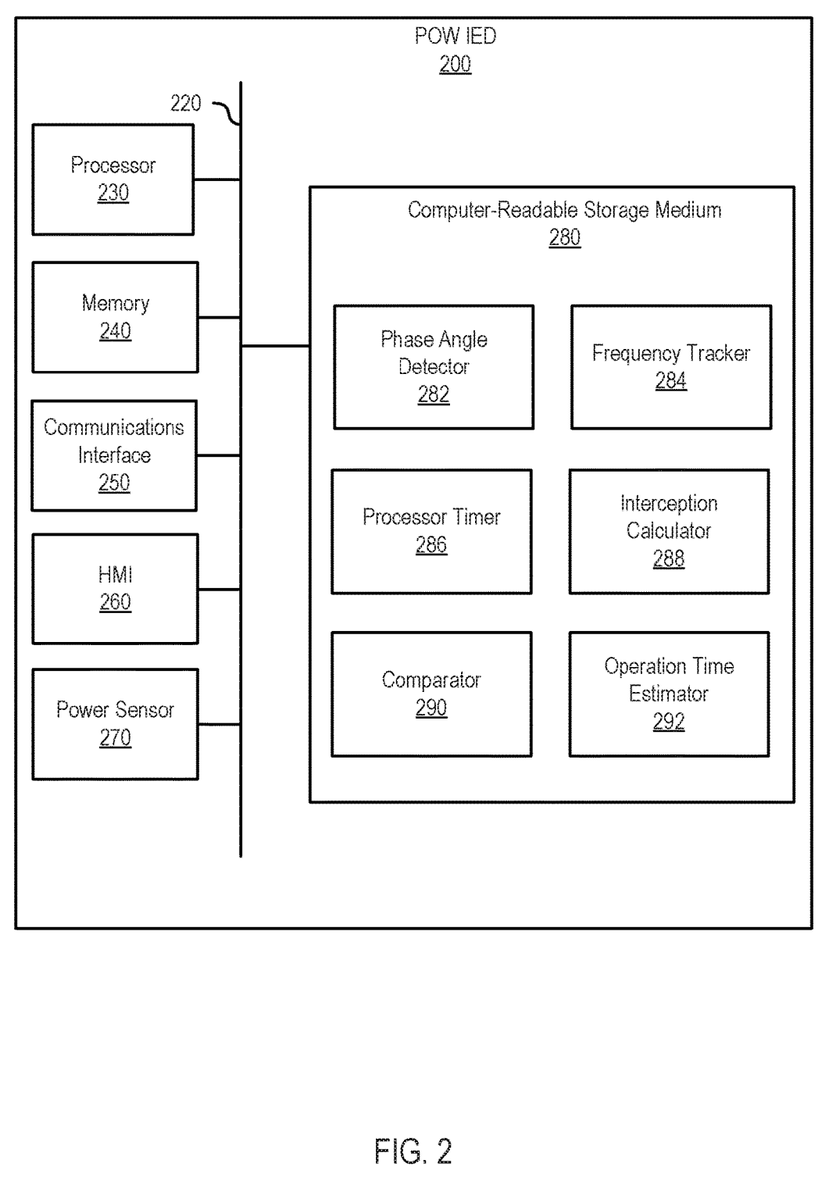
FIG. 2 is a functional block diagram of a system to manage point on wave switching, according to one embodiment.

FIG. 2 is a functional block diagram of a POW IED 200, according to one embodiment. The POW IED 200 may be used to implement the controller 106 of FIG. 1. More specifically, the POW IED 200 may cause a switch to open or close when an alternating current reaches a specified orientation and magnitude.

POW switching allows for reactive devices to receive power and have power removed at a desired phase angle. If reactive devices are switched on and off at the desired POW, electrical noise and/or other disturbances on a power system may be circumvented. The POW IED 200 may achieve accurate POW switching without requiring an interrupt routine and/or a high processing speed. Specifically, the POW IED 200 may determine the phase angle and frequency for power delivered to a reactive device, determine an implementation period, and begin to issue a switching command (i.e., control command) when a target POW is an integer multiple of implementation periods away from occurring based on the phase angle and frequency of the incoming power. In one embodiment, the POW IED 200 may manage or control POW switching for a three-phase power system (such as the three-phase power system 100 of FIG. 1).

According to FIG. 2, the POW IED 200 may comprise a computer-readable storage medium 280, a processor 230, memory 240, a communications interface 250, a power sensor 270, and a bus 220 to interconnect the components. In various embodiments, the processor 230 may perform tasks such as computing, compiling, and/or executing computer executable instructions. The communications interface 250 may communicate with various breakers, switches, relays, devices, generators, loads, human readable interfaces, utility phase lines, utility power lines, power sensors, and/or external or internal processors or IEDs. Also, the communications interface 250 may receive control operation requests and deliver operation commands to breakers, switches, and/or relays of a power system. The power sensor 270 may comprise various sensors such as current sensors, voltage sensors, hall effect sensors, power sensors, and/or any other suitable mechanism(s) for gathering power information from power lines of a power system. The power sensor 270 may generate a signal proportional to the current or voltage on the power lines of a power system.

The memory 240 and/or the computer-readable storage medium 280 may be any piece of hardware capable of storing information such as data, computer programs, and/or other suitable information. The memory 240 may include volatile memory and/or non-volatile memory, and may be fixed or removable. The memory 240 may include RAM, ROM, a hard drive, a flash memory, a thumb drive, an optical disk, a magnetic tape, or some combination of the above. In one embodiment, the memory 240 may be used to store instructions to be executed by the processor 230.

The computer-readable storage medium 280 may be a non-transitory memory device, according to one embodiment, and include any number of modules (e.g., 282, 284, 286, 288, 290, 292 described below) for performing tasks for POW switching. In some embodiments, one or more of the modules may be implemented in hardware and/or firmware instead of software. In some embodiments, one or more of the modules may be implemented in a cloud-based or remote location and interface via a communication interface, such as the communications interface 250 of the POW IED 200.

The computer-readable storage medium 280 may comprise various modules, including a phase angle detector 282, a frequency tracker 284, a processor timer 286, an interception calculator 288, a comparator 290, and/or an operation time estimator 292. The computer-readable storage medium 280 may also include user preferences and other data, which may be used and/or generated by the various modules. For example, a user may set a threshold value that provides a time limit to the switching process.

The phase angle detector 282 may determine based on the signal output by the power sensor 270 the power phase angles and/or the magnitude of the voltage, current, and/or power from power lines of a power system. If the POW IED 200 is implemented for POW switching within a three-phase power system, the phase angle detector 282 may determine via the power sensor 270 the power phase angle for each phase of the three-phase power system. In one embodiment, the relative phases are known for a three-phase power system, and the phase angle detector 282 determines via the power sensor 270 the power phase angle for only one of the phases and the other two are calculated according to the known relation between the three phases.

The frequency tracker 284 may determine based on the signal output by the power sensor 270 the power frequency. If the POW IED 200 is implemented for POW switching within a three-phase power system, the frequency tracker 284 may determine via the power sensor 270 the power frequency for each phase of the three-phase power system. In one embodiment, the frequency is the same for each of the three phase lines of a three-phase power system, and the frequency tracker 284 determines via the power sensor 270 the power frequency of only one phase line and the other two are determined to be equal to the first. The frequency tracker 284 may also determine via the power sensor 270 any changes of the power frequency. In various embodiments, the frequency tracker 284 may determine via the power sensor 270 a running average of the power frequency.

The processor timer 286 may determine the frequency or clock rate of the processor 230. Further, if the POW IED 200 is implemented for POW switching on a power system, the processor timer 286 may determine the frequency or clock rate of any processors of any involved breakers, relays, and/or switches. The processor timer 286 may receive the frequency or clock rate of the processor 230 as a variable or user input or by direct measurement.

The operation time estimator 292 may determine the implementation period. In one example, the implementation period may comprise the sum of the number of processing cycles required to issue a control command and the number of processing cycles required to implement the control command. Specifically, the operation time estimator 292 may consider the processing speed of the processor 230, the processing speed of any processors of any involved breakers or switches, the physical/mechanical delay of the breakers or switches, the electrical delay of the breakers or switches, the stack priority of the processor 230, the stack priority of any processors of the breakers or switches, and/or any environmental factors or conditions that may affect the processing speed of the processor 230 and/or the physical/mechanical delay of the breakers or switches. In various embodiments, the environmental factors or conditions may comprise ambient temperature and time since last operation. In various embodiments, the operation time estimator 292 may adjust the operation time based on environmental factors. The operation time estimator 292 may receive the frequency or clock rate of the processor 230 or any processors of the breakers or switches from the processor timer 286. If the POW IED 200 is implemented within a three-phase power system, the operation time estimator 292 may determine an implementation period for each of the three phases of the three-phase power system.

Thus, the operation time estimator 292 may provide dynamic apparatus mechanism delay times. In some embodiments, the operation time estimator 292 may use secondary current and voltage measurements, trip buses asserted indication, and optional ambient temperature input. For example, the operation time estimator 292 may take the difference from the time the voltage on a power line reached a target POW (e.g., zero) and the time the trip bus asserted. The resulting time value may be the delay time stored for the next operation calculation. A bias value could be applied for variations in ambient temperature and the number of days since the POW IED or switch last operated. Alarms could be provided for slower than expected operate times.

The interception calculator 288 may determine incoming POWs based on information from the phase angle detector 282 and the frequency tracker 284. If the POW IED 200 is implemented for POW switching within a three-phase power system, the interception calculator 288 may determine a series of incoming POWs (such as the set 400 of FIG. 4) for each of the three phases of the three-phase power system. In one embodiment, the interception calculator 288 receives the implementation period from the operation time estimator 292 and only determines incoming POWs that occur after one implementation period.

The comparator 290 may receive the implementation period from the operation time estimator 292 and the incoming POWs from the interception calculator 288. Further, the comparator 290 may determine a target POW (where the target POW is at least one implementation period from occurring) and send a command to the processor 230 to begin implementing a control or switching command. The comparator 290 may issue the control or switching command such that the switching occurs at the target POW. To cause the command to switch at the target POW the comparator 290 may delay issuing the command until the end of the implementation period lines up with the target POW.

In various embodiments, the target POW may be a desired POW that occurs within the fewest implementation periods. If the POW IED 200 is implemented for POW switching within a three-phase power system, the comparator 290 may receive a series of incoming POW values for each of the three phases (such as the set 400 of FIG. 4) from the interception calculator 288. The comparator 290 may also receive an implementation period for each of the three phases of the three-phase power system. Further, the comparator 290 may determine target POWs for each of the three phases. In one embodiment, the comparator 290 may determine a group of target POW angles with a shortest time between each phase using the series of incoming POW values for each of the three phases from the interception calculator 288. Further, according to the embodiment, the target POWs may each occur after at least one implementation period, but within a user-defined threshold. In one embodiment, a user may define a first threshold such that the target POWs do not differ by more than the first threshold.

Further, according to the embodiment, a user may define a second threshold or implementation threshold that defines a time period in which the target POWs should occur. The comparator 290 may compare an implementation period with a user defined implementation threshold. If the delay causes the implementation period to exceed the user defined implementation threshold, the processor will determine a second group of target POW angles that is within the user defined implementation threshold. If the first threshold cannot be met within the second threshold, a user may allow either the first and/or the second threshold to be re-adjusted. Once the target POWs are determined for a three-phase power system, the comparator 290 may send a command to the processor 230 to begin implementing appropriate control or switching commands.

Figure 3:
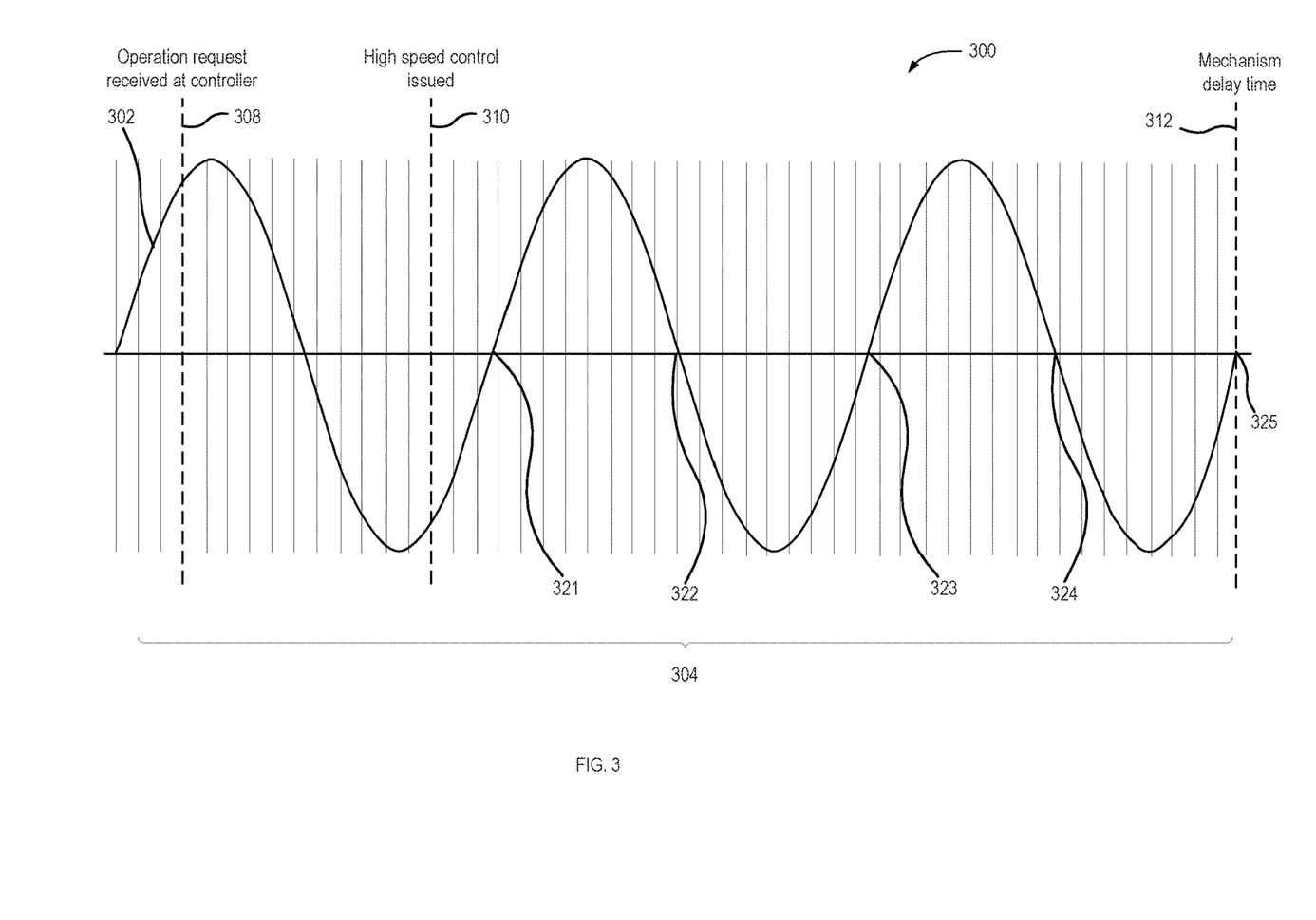
FIG. 3 is a plot of power versus processing cycles, wherein processing and switching actions are indicated, according to one embodiment.

FIG. 3 is a plot 300 of voltage 302 across a number of processor cycles 304, according to one embodiment of a POW switching application. The plot 300 may be a plot of voltage on a power line. The processor cycles 304 may be the processor cycles of a POW controller. As illustrated in FIG. 3, the voltage 302 may be time varying. More specifically, the voltage 302 may be sinusoidal.

POW switching allows for reactive devices to receive power and have power removed at the desired phase angle. If reactive devices are switched on and off at the desired POW, electrical noise and/or other disturbances on a power system may be circumvented. The plot 300 of FIG. 3 illustrates how accurate POW switching may be achieved without requiring an interrupt routine and/or a high processing speed. Specifically, POW switching may be achieved by determining the phase angle and frequency for power delivered to a reactive device, determining an implementation period, and issuing a switching command (i.e., control command) when a target POW (e.g., 321, 322, 323, 324, 325 described below) is at least one implementation period away from occurring based on the phase angle and frequency of the incoming power.

According to FIG. 3, a user may request that certain control operations or actions be performed (e.g. that the breaker or switch turn on or off). A user may send the request via a server to a POW controller. The POW controller may receive the request during a first processor cycle 308.

Upon receiving a request for a control operation, the POW controller may determine the phase angle and frequency of the voltage 302 and accordingly determine a series of target POWs 321, 322, 323, 324, 325. In the illustrated embodiment, the target POWs are zero crossings; however, in other embodiments the target POW may be another point (e.g., a nonzero power point).

Further, upon receiving the request, the POW controller may determine an implementation period. According to various embodiments, the implementation period may comprise the processor delay (i.e., the number of processor cycles 304 required to issue a high-speed control action) as well as the physical delay (i.e., the number of processor cycles 304 that occur during the mechanical delay of the breaker or switch). The implementation period may further comprise a POW delay (i.e., the number of processor cycles 304 after the processor delay and the physical delay before a target POW occurs). The POW controller may begin to implement the operation request at a processing cycle that causes the switching action to happen at a target POW 325. Specifically, the POW controller may begin to implement the operation request at a moment such that the high-speed control action is issued 310 at a moment that allows the mechanical delay time to finish 312 at a target POW 325.

In one example, an operation request is received at the controller after three processor cycles 308. The POW controller may determine the phase angle and frequency of the voltage 302 and accordingly a series of target POWs 321, 322, 323, 324, 325. Further, the POW controller may determine an implementation period, where the implementation period comprises a processor delay, a physical delay, and a POW delay. The POW controller may determine that the mechanical delay time of the breaker or switch is 36 processor cycles. The POW controller may also determine that the processor delay is six processor cycles. Accordingly, the POW controller may determine that the POW delay is five processor cycles. In the example, the implementation period would be 47 processor cycles. In the example, the POW controller receives the operation request at the controller after three processor cycles 308 and the high-speed control action is issued after 14 processor cycles 310 (i.e., 11 processor cycles 304 after the operation request is received at the controller). According to the example, the mechanical delay time finishes after 50 processor cycles 312 (i.e., 36 processor cycles after the high-speed control action is issued) at a target POW 325.

Figure 4:
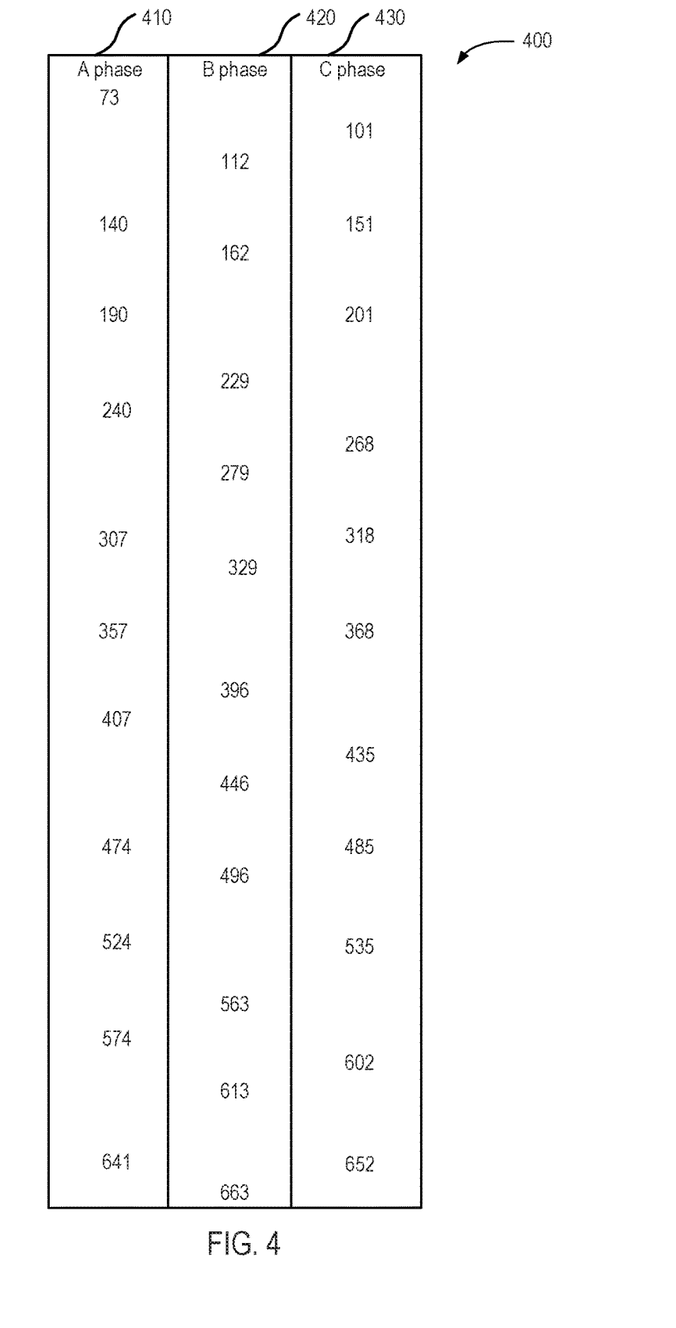
FIG. 4 is a chart of select processor cycles for three phases of a three-phase power system, according to one embodiment.

FIG. 4 is a set 400 of processing cycles that corresponds to POW crossings for each phase (phase A 410, phase B 420, and phase C 430) of a three-phase power system (such as the three-phase power system 100 of FIG. 1). In a three-phase power system, it may be desirable to switch each phase at a certain POW. It may also be desirable to switch each phase in the shortest amount of time. Further, it may be desirable to switch each phase with minimal delay. Accurate POW switching may be achieved for a three-phase power system by considering and minimizing the difference between the number of processor cycles that occur for the different POW crossings for the three phases.

In one embodiment, a user may define a first threshold, where the difference between the number of processor cycles that occur for the different POW crossings for the three phases may not exceed the first threshold. Further, a user may define a second threshold, where the total number of processor cycles before POW switching occurs should be less than the second threshold. In various embodiments, the first and/or second threshold may be relaxed if the first and/or second threshold cannot be met.

In one example, a user may define a first threshold of 30 processor cycles and a second threshold of 120 processor cycles. According to the set 400 of FIG. 4, the second threshold of 120 processor cycles includes a first POW crossing for phase A 410 at 73 processor cycles, a first POW crossing for phase B 420 at 112 processor cycles, and a first POW crossing for phase C 430 at 101 processor cycles. There are 39 processor cycles that occur between the first POW crossings for phase A 410 and phase B 420. According to the example, the first threshold is not met within the second threshold. If the second threshold is relaxed to 170 processor cycles, the second threshold will further include a second POW crossing for phase A 410 at 140 processor cycles, a second POW crossing for phase B 420 at 162 processor cycles, and a second POW crossing for phase C 430 at 151 processor cycles. There are 22 processor cycles that occur between the second POW crossings for phase A 410 and phase B 420. Further, there are 11 processor cycles between the second POW crossings for phase B 420 and phase C 430. According to the example, the first threshold is met within the new second threshold.

In another example, a user may define a first threshold of 30 processor cycles and a second threshold of 120 processor cycles. According to the previous example, the first threshold cannot be met within the second threshold. If the first threshold is relaxed to 40 processor cycles, the first threshold will be met within the original second threshold.

Figure 5:
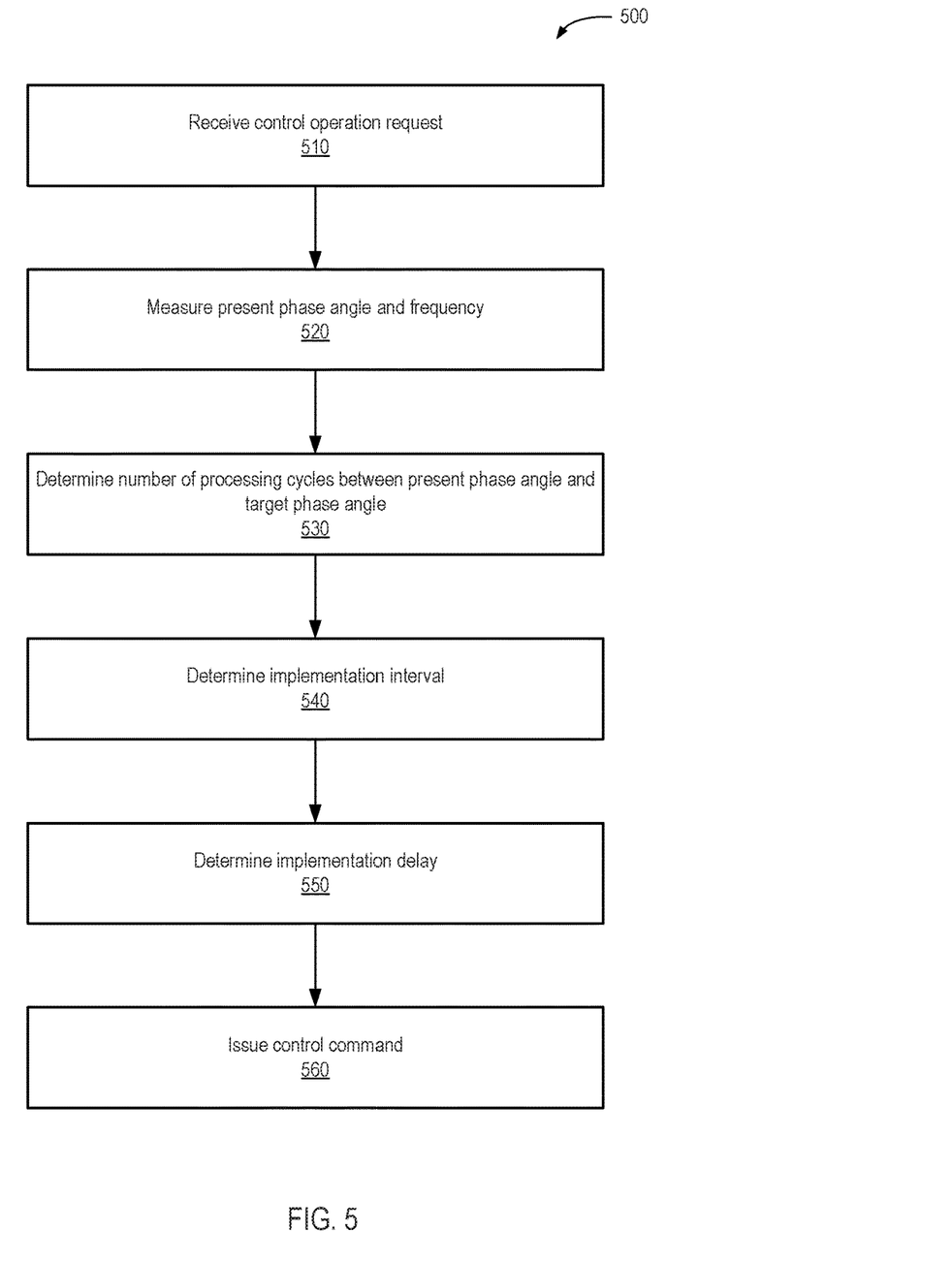
FIG. 5 is a flow chart for a point on wave switching method, according to one embodiment.

FIG. 5 is a flow chart for a POW switching method 500, according to one embodiment. The method 500 may be implemented on a POW controller (such as the POW IED 200 of FIG. 2). In various embodiments, the POW controller may control power through a breaker or switch to a reactive device.

POW switching allows for reactive devices to receive power and have power removed at approximately the same phase angle. If reactive devices are switched on and off at the same POW, electrical noise and/or other disturbances on a power system may be circumvented. The method 500 may allow for accurate POW switching without an interrupt routine and/or a high processing speed.

The method 500 includes receiving 510 a control operation request. The control operation request may be sent from a user via a server and received 510 at a POW controller. The control operation request may be a request to open or close a breaker or switch (i.e., to control the flow of power to a reactive device).

The method 500 further includes measuring 520 a present angle and frequency of power being delivered to the reactive device. The POW controller may measure 520 the present angle and frequency via a power sensor, current sensor, voltage sensor, and/or any other suitable mechanism for obtaining phase and frequency readings.

Also, the method 500 includes determining 530 or calculating the number of processing cycles between the present phase angle and a target phase angle (i.e., target POW). The processing cycles may be the processor cycles of a POW controller. Further, the target phase angle may be an incoming POW at which it is desired that a control or switching application be completed.

The method 500 also includes determining 540 an implementation interval. According to various embodiments, the implementation interval comprises the number of processing cycles used by a processor to issue a control command. The implementation interval may further comprise an operation time for a switch to complete the control command. In various embodiments, the operation time may comprise the number of processing cycles that occur during the mechanical or physical delay of a switch or breaker. Further, the operation time may comprise the number of processing cycles that occur for any processors of any relevant breakers or switches to perform a switching command.

The method 500 further includes determining 550 an implementation delay. The implementation delay may comprise the number of processing cycles between the present phase angle and the target phase angle reduced by the implementation interval. For example, if the implementation interval is 50 processing cycles and the target phase angle (i.e., target POW) occurs after 60 processing cycles, the implementation interval would be 10 processing cycles.

Further, the method 500 includes issuing 560 a control command. Specifically, the method 500 may issue 560 a requested control operation beginning when the number of processing cycles between the present phase angle and the target phase angle at the present phase frequency is equal to the implementation interval. In some embodiments, the method 500 may issue 560 the requested control operation after the implementation delay. The method 500 may issue 560 a control command by sending a signal to switch a breaker and/or switch that controls the flow of power to a reactive device.

Figure 6:
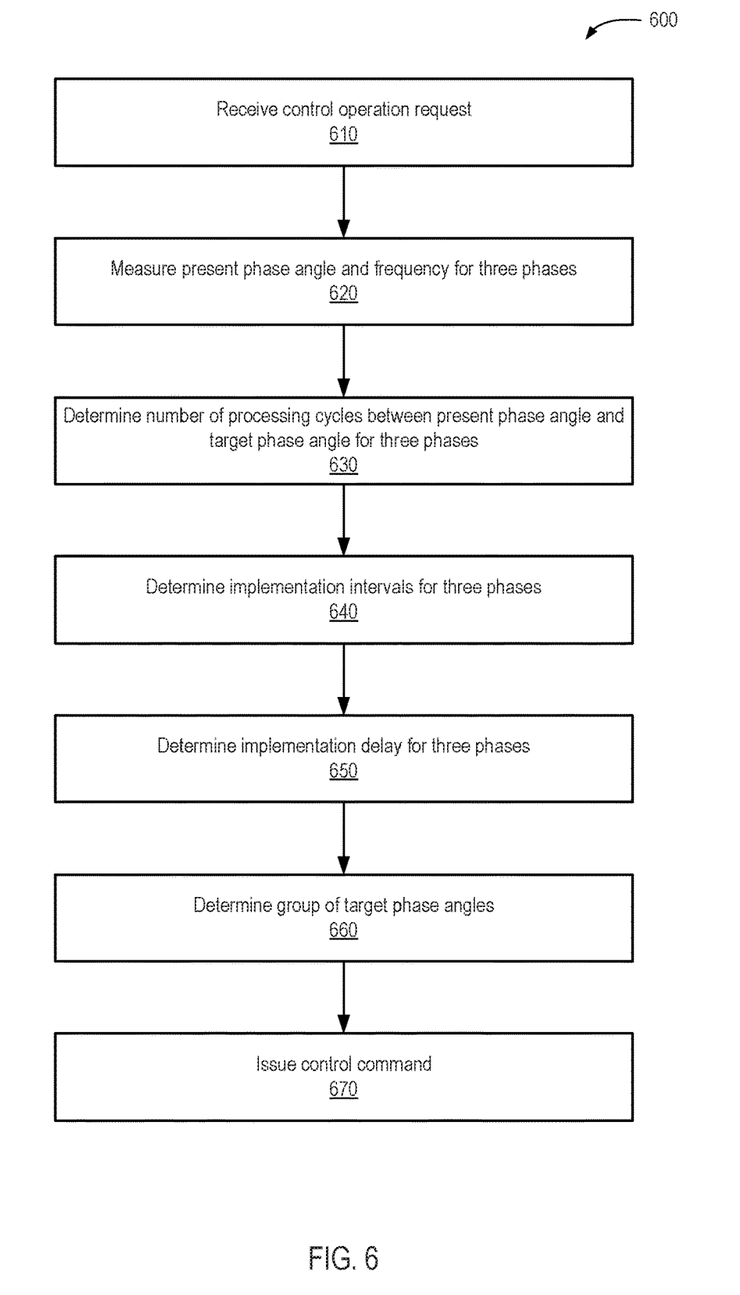
FIG. 6 is a flow chart for a point on wave switching method for a three-phase power system.

FIG. 6 is a flow chart for a POW switching method 600 for a three-phase power system (such as the three-phase power system 100 of FIG. 1), according to one embodiment. The method 600 may be implemented on a POW controller (such as the POW IED 200 of FIG. 2 or the controller 106 of FIG. 1). In various embodiments, the POW controller may control power through breakers or switches to reactive devices.

POW switching allows for reactive devices to receive power and have power removed at approximately the desired phase angle. If reactive devices are switched on and off at the same POW, electrical noise and/or other disturbances on a power system may be circumvented. The method 600 may allow for accurate POW switching on three phases without an interrupt routine and/or a high processing speed.

The method 600 includes receiving 610 a control operation request. The control operation request may be sent from a user via a server (such as the server 102 of FIG. 1) and received 610 at a controller (such as the controller 106 of FIG. 1). The control operation request may be a request to open or close breakers or switches (i.e., to control the flow of power to reactive devices such as the capacitor bank 140 of FIG. 1).

The method 600 further includes measuring 620 the present angles and frequencies of power being delivered to the reactive devices. A POW controller may measure 620 the present angles and frequencies via power sensors, current sensors, voltage sensors, and/or any other suitable mechanisms for obtaining phase and frequency readings. In one embodiment, the present angles and frequencies of the three phases are measured 620 individually. In another embodiment, the relative phase angles and frequencies are known. According to the embodiment, the present phase angle and frequency of only one of the three phases is measured 620 and the present phase angles and frequencies of the other two phases are determined implicitly.

Also, the method 600 includes determining 630 a set of target phase angles (such as the set 400 of FIG. 4) for three phases. Specifically, the method 600 may determine 630 the number of processing cycles between present phase angles and target phase angles for the set of target phase angles. The processing cycles may be the processor cycles of a POW controller. Further, the target phase angles may be incoming POWs at which it is desired that control or switching applications for the three phases be completed.

The method 600 also includes determining 640 implementation intervals for each of the three phases. According to various embodiments, the implementation intervals each comprise the number of processing cycles used by a processor to issue a control command. The implementation intervals may each further comprise an operation time for a respective switch or breaker to complete the control command. In various embodiments, the operation time may comprise the number of processing cycles that occur during the mechanical or physical delay of a switch or breaker. Further, the operation time may comprise the number of processing cycles that occur for any processors of any relevant breakers or switches to perform a switching command.

The method 600 further includes determining 650 implementation delays for each of the three phases. Each implementation delay may comprise the number of processing cycles between the present phase angle and the target phase angle reduced by the implementation interval. For example, if the implementation interval is 50 processing cycles and the target phase angle (i.e., target POW) occurs after 60 processing cycles, the implementation interval would be 10 processing cycles.

The method 600 also includes determining 660 a group of target phase angles based on how many processing cycles are between target phase angles corresponding to each phase. In one embodiment, the group of target phase angles may be the group that has the fewest processing cycles between the target phase angles corresponding to each phase to minimize delays between switching commands. In another embodiment, a user may define a first threshold, where the number of processing cycles between the target phase angles corresponding to each phase should be less than the first threshold. Further, the user may define a second threshold, where the total number of processing cycles before switching occurs is less than the second threshold. In various embodiments, if the first and/or second thresholds cannot be met, the first and/or second thresholds may be relaxed.

Further, the method 600 includes issuing 670 a control command for the three phases. Specifically, the method 600 may issue 670 a requested control operation beginning on each phase when the number of processing cycles between the present phase angles and the target phase angles of a group of target phase angles at the present phase frequency is equal to the respective implementation intervals of each phase. In some embodiments, the method 600 may issue 670 the requested control operation for each phase after the respective implementation delay for each phase. The method 600 may issue 670 a control command by sending signals to switch various breakers and/or switches that control the flow of power to reactive devices.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims.

The invention claimed is:

1. An intelligent electronic device (IED) for point on wave (POW) switching, the IED comprising:
   a communications interface to receive a control operation request;
   a voltage sensor to detect a voltage phase angle and frequency; and
   a processor in communication with the network interface and the voltage sensor, the processor to perform a series of operations when the network interface receives the control operation request, the operations comprising:
      determine, via the voltage sensor, the present phase angle and frequency,
      determine a number of processor cycles that allows issuing a control command to implement the control operation request,
      determine an implementation period to execute the control command, the implementation period determined based on the number of processor cycles, and
      begin to issue the control command when a target POW angle is the implementation period away from occurring based on the present phase angle and frequency.

2. The IED of claim 1, wherein the voltage sensor detects a present phase angle and frequency on each phase of a three-phase system, and
   wherein the processor is further to determine an implementation period for each phase.

3. The IED of claim 2, wherein the processor is further to:
   determine a series of target POW angles for each phase; and
   determine a group of target POW angles with a shortest time between each phase using the series of target POW angles for each phase,
   wherein the implementation period further comprises a delay based on the group of target POW angles.

4. The IED of claim 3, wherein the processor is further to compare the implementation period with a user defined implementation threshold, wherein if the delay causes the implementation period to exceed the user defined implementation threshold, the processor will determine a second group of target POW angles that is within the user defined implementation threshold.

5. The IED of claim 1, further comprising a switch,
wherein the processor further determines an operation time for the switch to complete the control command, and
wherein the implementation period includes the operation time.

6. The IED of claim 5, wherein the processor is further to adjust the operation time based on environmental conditions.

7. The IED of claim 6, wherein the environmental conditions comprise ambient temperature and time since last operation.

8. The IED of claim 5, wherein the processor is further to send an alarm signal if execution of the control command exceeds the operation time.

9. The IED of claim 5, wherein the operation time is based on execution time of previous control commands.

10. A method for point on wave (POW) switching, the method comprising:
determining an implementation interval, the implementation interval comprising processing cycles used by a processor to issue a control command;
measuring, via a voltage sensor, a present phase angle and a phase frequency;
determining a number of processing cycles between the present phase angle and a target phase angle at the phase frequency; and
issuing the control command beginning when a length of time to complete the number of processing cycles between the present phase angle and the target phase angle at the phase frequency is equal to the implementation interval.

11. The method of claim 10, further comprising determining an implementation delay, the implementation delay comprising a number of processing cycles between the present phase angle and the target phase angle reduced by the implementation interval, wherein the control command is issued after the implementation delay.

12. The method of claim 10, wherein determining a number of processing cycles between the present phase angle and a target phase angle is performed on each phase of a three-phase system.

13. The method of claim 12, further comprising determining a group of target phase angles based on how many processing cycles are between target phase angles corresponding to each phase.

14. The method of claim 13, wherein issuing the control command begins on each phase based on the group of target phase angles.

15. The method of claim 10, wherein the implementation interval further comprises an operation time for a switch to complete the control command.

16. A non-transitory computer readable medium storage medium including computer-readable instructions that, when executed by one or more processors, cause an intelligent electronic device (IED) to:
determine how many processing cycles are used by a processor to issue a control command;
measure, via a voltage sensor, a present phase angle and a frequency;
calculate how many cycles are between a present phase angle and a target phase angle at the frequency; and
execute the control command to cause a switch to change positions, wherein the processors begin to issue the control command prior to the target phase angle based on how many processing cycles are used by the processor to issue the control command.

17. The non-transitory computer readable medium storage medium of claim 16, wherein determining how many processing cycles are used by a processor to issue a control command is based on availability of processor resources.

18. The non-transitory computer readable medium storage medium of claim 16, wherein the instructions further cause the IED to calculate a delay caused by the switch and begin to issue the control command prior to the target phase angle based on how many processing cycles are used by the processor to issue the control command and the delay caused by the switch.

19. The non-transitory computer readable medium storage medium of claim 16, wherein the instructions further cause the IED to determine processing cycle delays between available target phase angles of each phase on a three-phase system within a predefined threshold.

20. The non-transitory computer readable medium storage medium of claim 16, wherein the control command is executed on each phase such that processing cycle delays between available target phase angles of each phase are minimized.

* * * * *